(12) United States Patent
Hamann et al.

(10) Patent No.: US 7,003,596 B2
(45) Date of Patent: Feb. 21, 2006

(54) SYSTEM AND METHOD FOR ACCESSING READERS AND OTHER I/O DEVICES BY PROGRAMS

(75) Inventors: Ernst-Michael Hamann, Boeblingen (DE); Klemens Klaffke, Boeblingen (DE); Robert Sulzmann, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 10/045,257

(22) Filed: Oct. 25, 2001

(65) Prior Publication Data

US 2002/0091880 A1    Jul. 11, 2002

(30) Foreign Application Priority Data

Oct. 27, 2000    (EP) .................................. 00123510

(51) Int. Cl.
*G06F 3/00*    (2006.01)
(52) U.S. Cl. ........................ 710/40; 9/12; 9/14; 9/39; 9/72
(58) Field of Classification Search ................ 710/9, 710/10, 11, 12, 13, 14, 62, 72, 40
See application file for complete search history.

(56) References Cited

U.S. PATENT DOCUMENTS

| | | | |
|---|---|---|---|
| 3,810,105 A | | 5/1974 | England |
| 5,898,845 A | * | 4/1999 | Frantz et al. ................ 710/104 |
| 5,928,347 A | * | 7/1999 | Jones ......................... 710/305 |
| 6,286,060 B1 | * | 9/2001 | DiGiorgio et al. ............ 710/31 |
| 6,438,638 B1 | * | 8/2002 | Jones et al. .................. 710/301 |

* cited by examiner

*Primary Examiner*—Kim Huynh
*Assistant Examiner*—Alan S. Chen
(74) *Attorney, Agent, or Firm*—Louis P. Herzberg

(57) ABSTRACT

The present invention allows program specific configuration of several physical or logical readers, or other I/O devices, by using a configuration tool and a reader access layer. In an example embodiment, a configuration tool allows, a specifying access rights and priority rights for each single reader in conjunction with each single program. A reader access layer communicates with each program directly, calls up the reader access list for the requesting program, checks the access rights and the priority order for the available readers and returns a response to the requesting program containing information for accessing the active reader with the highest available priority. It secures previously defined access rights and access priorities between readers and programs defined in the reader access list remain unchanged independently when new readers are added.

9 Claims, 7 Drawing Sheets

| Order | Device | Class | Status | Appl.AA | Appl.BB |
|---|---|---|---|---|---|
| 1 | B-Vendor Terminal A | direct | no card | wait | wait |
| 2 | Y-Vendor Terminal A | direct | no card | wait | wait |
| 3 | A-Vendor Terminal 1 | PC/SC | no card | wait | wait |
| 4 | X-Vendor Terminal 1 | PC/SC | card ins. | access 1 | access 1 |
| 5 | ABC-Virtual Card | VSC | enabled | access 2 | access 2 |
| 6 | XYZ-Virtual Card | VSC | enabled | access 3 | access 3 |

FIG. 1A

| Order | Device | Class | Status | Appl.AA | Appl.BB |
|---|---|---|---|---|---|
| 1 | B-Vendor Terminal A | direct | no card | wait | wait |
| 2 | Y-Vendor Terminal A | direct | no card | wait | wait |
| 3 | A-Vendor Terminal 1 | PC/SC | card ins. | access 1 | access 1 |
| 4 | X-Vendor Terminal 1 | PC/SC | card ins. | access 2 | access 2 |
| 5 | ABC-Virtual Card | VSC | enabled | access 3 | access 3 |
| 6 | XYZ-Virtual Card | VSC | enabled | access 4 | access 4 |

FIG. 1B

| Order | Device | Class | Status | Appl.AA | Appl.BB |
|---|---|---|---|---|---|
| 1 | B-Vendor Terminal A | direct | no card | wait | wait |
| 2 | Y-Vendor Terminal A | direct | no card | wait | wait |
| 3 | A-Vendor Terminal 1 | PC/SC | card ins. | access 1 | access 1 |
| 4 | A-Vendor Terminal 2 | PC/SC | card ins. | access 2 | access 2 |
| 5 | X-Vendor Terminal 1 | PC/SC | card ins. | access 3 | access 3 |
| 6 | ABC-Virtual Card | VSC | enabled | access 4 | access 4 |
| 7 | XYZ-Virtual Card | VSC | enabled | access 5 | access 5 |

FIG. 1C

| # | Device | Class | Status |
|---|---|---|---|
| 1 | B-Vendor Terminal A | direct | no card |
| 2 | Y-Vendor Terminal A | direct | no card |
| 3 | A-Vendor Terminal 1 | PC/SC | no card |
| 4 | X-Vendor Terminal 1 | PC/SC | card ins. |
| 5 | ABC-Virtual Card | VSC | enabled |
| 6 | XYZ-Virtual Card | VSC | disabled |

FIG. 4A

| # | Device Name | standard priority | Appl. AA priority | Appl. BB priority |
|---|---|---|---|---|
| 1 | B-Vendor Terminal A | 4 | 2 | 2 |
| 2 | Y-Vendor Terminal A | 3 | 3 | 1 |
| 3 | A-Vendor Terminal 1 | 5 | 0 | 4 |
| 4 | X-Vendor Terminal 1 | 1 | 1 | 3 |
| 5 | ABC-Virtual Card | 6 | 0 | 0 |
| 6 | XYZ-Virtual Card | 2 | 4 | 0 |

FIG. 4B

| stand. prior. | Device | Status | standard priority | Appl. AA priority | Appl. BB priority |
|---|---|---|---|---|---|
| 1 | X-Vendor Terminal 1 | card ins. | access 1 | access 1 | wait (3) |
| 2 | XYZ-Virtual Card | disabled. | wait | wait (4) | - |
| 3 | Y-Vendor Terminal A | no card | wait | wait (3) | wait (1) |
| 4 | B-Vendor Terminal A | no card | wait | wait (2) | wait (2) |
| 5 | A-Vendor Terminal 1 | no card | wait | - | wait (4) |
| 6 | ABC-Virtual Card | enabled | access 2 | - | - |

FIG. 4C

| stand. prior. | Device | Status | standard priority | Appl. AA priority | Appl. BB priority |
|---|---|---|---|---|---|
| 1 | X-Vendor Terminal 1 | card ins. | access 1 | access 1 | wait (3) |
| 2 | XYZ-Virtual Card | disabled | wait | wait (4) | - |
| 3 | Y-Terminal A | no card | wait | wait (3) | wait (1) |
| 4 | B-Terminal A | no card | wait | wait (2) | wait (2) |
| 5 | A-Vendor Terminal 1 | card ins. | access 2 | - | access 1 |
| 6 | ABC-Virtual Card | enabled | access 3 | - | - |

FIG. 4D

| # | Device | Class | Status |
|---|---|---|---|
| 1 | B-Vendor Terminal A | direct | no card |
| 2 | Y-Vendor Terminal A | direct | no card |
| 3 | A-Vendor Terminal 1 | PC/SC | no card |
| 4 | A-Vendor Terminal 2 | PC/SC | card ins. |
| 5 | X-Vendor Terminal 1 | PC/SC | card ins. |
| 6 | ABC-Virtual Card | VSC | enabled |
| 7 | XYZ-Virtual Card | VSC | disabled |

FIG. 4E

| # | Device Name | standard priority | Appl. AA priority | Appl. BB priority |
|---|---|---|---|---|
| 1 | B-Vendor Terminal A | 4 | 2 | 2 |
| 2 | Y-Vendor Terminal A | 3 | 3 | 1 |
| 3 | A-Vendor Terminal 1 | 5 | 0 | 4 |
| 4 | A-Vendor Terminal 2 | 7 | 0 | 0 |
| 5 | X-Vendor Terminal 1 | 1 | 1 | 3 |
| 6 | ABC-Virtual Card | 6 | 0 | 0 |
| 7 | XYZ-Virtual Card | 2 | 4 | 0 |

FIG. 4F

| stand. prior. | Device | Status | standard priority | Appl. AA priority | Appl. BB priority |
|---|---|---|---|---|---|
| 1 | X-Vendor Terminal 1 | card ins. | access 1 | access 1 | wait (3) |
| 2 | XYZ-Virtual Card | disabled | wait | wait (4) | - |
| 3 | Y-Terminal A | no card | wait | wait (3) | wait (1) |
| 4 | B-Terminal A | no card | wait | wait (2) | wait (2) |
| 5 | A-Vendor Terminal 1 | card ins. | access 2 | - | access 1 |
| 6 | ABC-Virtual Card | enabled | access 3 | - | - |
| 7 | A-Vendor Terminal 2 | card ins. | access 4 | - | - |

FIG. 4G

| # | Device Name | standard priority | Appl. AA priority | Appl. BB priority | Appl. CC priority |
|---|---|---|---|---|---|
| 1 | B-Vendor Terminal A | 4 | 2 | 2 | 0 |
| 2 | Y-Vendor Terminal A | 3 | 3 | 1 | 0 |
| 3 | A-Vendor Terminal 1 | 5 | 0 | 4 | 0 |
| 4 | A-Vendor Terminal 2 | 6 | 0 | 0 | 1 |
| 5 | X-Vendor Terminal 1 | 1 | 1 | 3 | 0 |
| 6 | ABC-Virtual Card | 7 | 0 | 0 | 2 |
| 7 | XYZ-Virtual Card | 2 | 4 | 0 | 0 |

FIG. 4H

SYSTEM AND METHOD FOR ACCESSING READERS AND OTHER I/O DEVICES BY PROGRAMS

FIELD OF INVENTION

The present invention relates program specific configuration of several physical or logical attachments in a system. It more particularly relates to controlling access of programs to various I/O devices considering use restrictions and priority orders assigned to the programs.

BACKGROUND OF THE INVENTION

To write and to read data to a smart card or to execute a command on a smart card, it is necessary to use a connection with the card. The connection with the smart card is made by using a reader. Readers of the same manufacturer use some software support (driver) for communication with programs by using a standard reader API (Programming Interface) preferably. In this case user can replace one reader with another compatible reader without changing code of the program.

However, many of the programming interfaces of the readers (driver) currently available are not fully standardized. Thus readers of different or the same manufacturers may be present concurrently at the same system for different programs. Furthermore, there are use restrictions of certain types of smart cards per reader or for security relevant programs in which the use of more than one card in one session is prohibited.

If several readers are installed on one system, the user is not able to select the right reader when a program requests to insert a smart card. Furthermore, if additional readers are installed after set up of the programs, the access priority of the installed readers may be changed. This may cause errors of the programs or could confuse the user when asked to insert a smart card into a reader. If several readers with different drivers share a logical I/O port, errors may occur depending on which reader is actually connected and powered on. Readers reserved for security relevant programs (e.g. used for user identification and authentication at system start) may be accessible for other programs which may cause the disruption of system services when a reader is locked by another reader or if the smart card having sensitive information is removed. This restricts the use of systems in which several parallel running programs having access to different readers having standard or nonstandard reader API.

U.S. Pat. No. 3,810,105 discloses a computer input-output system in which peripheral devices (e.g. readers) cooperate with hardware input-output processors independent from the central processor of the computer for handling the transfer of data between peripheral devices. Signal communication runs through special transmission facilities which include separate communication paths for the input-output processors, separate communication paths for control and data signals, and separate communication paths for determining priority of operations among several input-output processors and the CPU at memory. The devices are controlled by device controller including subcontrollers which together with a portion of the input-output processors provides a communication interface configuration between devices and input-output processors. There is no teaching or suggestion in that patent how readers may be accessed by user defined access conditions.

SUMMARY OF THE INVENTION

It is therefore an aspect of the present invention to provide an improved access control mechanism to readers or other I/O devices by programs installed on one system having access to various readers or other I/O devices avoiding the disadvantages of the other access control mechanisms.

The present invention allows a program specific configuration of several physical or logical readers or other I/O devices (hereinafter called readers) by using a configuration tool and a reader access layer. The configuration tool allows to specify access rights and priority rights for each single reader in conjunction with each single program. A program may or may not be granted access rights to a reader or a program can be granted access to several readers using a priority number for selecting the reader to be accessed at first.

The present invention secures that previously defined access rights and priorities between readers and programs defined in the reader access list remain unchanged independently when new readers are added. Amendments are allowed by the configuration tool only.

The present invention is especially valuable in the future when more and more security programs are using a mix of readers attached via the standard serial ports and an universal serial bus (USB) with automatic configuration at plug-in called "plug and play". Attaching a new reader will then not disrupt existing relationships between readers and programs.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 1(A) shows a prior art reader access list illustrating prior art access control mechanism;

FIG. 1(B) shows a reader access list according to FIG. 1(A) with the difference that two smart cards are inserted;

FIG. 1(C) shows a reader access list according to FIG. 1(B) with the difference that a new reader has been installed;

FIGS. 4(A–H) show examples of reader access lists illustrating the present invention.

DESCRIPTION OF THE INVENTION

Figure 2:
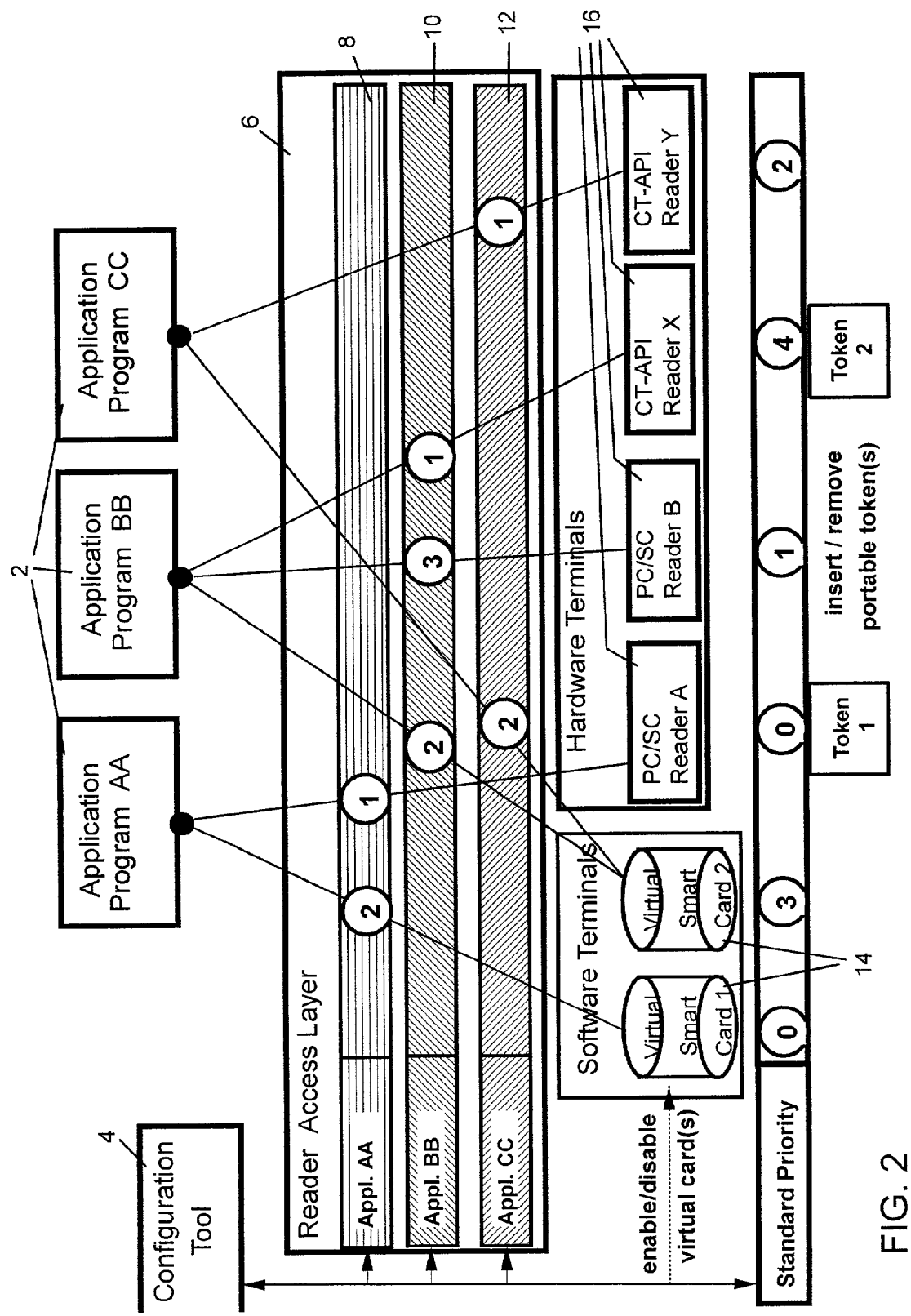
FIG. 2 shows an example of basic components of the present invention implemented in a typical communication architecture.

The present invention allows a program specific configuration of several physical or logical readers or other I/O devices (hereinafter called readers) by using a configuration tool and a reader access layer. The configuration tool allows to specify access rights and priority rights for each single reader in conjunction with each single program. A program may or may not be granted access rights to a reader or a program can be granted access to several readers using a priority number for selecting the reader to be accessed at first. In a case of failing of a reader (e.g. failing serial connection, failing battery, missing smart card) to be accessed at first, the reader with the next highest priority number has to be selected as backup-reader. Programs having no assigned priority using the standard priority specified in the reader access list. The reader access layer communicates with each program directly, e.g. receives all requests from program seeking access to a readers, calls up the reader access list for the requesting program, checks the access rights and the priority order for the available readers (e.g. which reader has to be accessed at first if more than one readers are accessible) and returns a response to the requesting program containing information for accessing the active reader with the highest priority.

The present invention secures that previously defined access rights and priorities between readers and programs defined in the reader access list remain unchanged independently when new readers are added. Amendments are allowed by the configuration tool only.

The present invention is especially valuable in the future when more and more security programs are using a mix of readers attached via the standard serial ports and an universal serial bus (USB) with automatic configuration at plug-in called "plug and play". Attaching a new reader will then not disrupt existing relationships between readers and programs.

FIGS. 1(A–C) show examples of reader access lists for smart card readers in a system using a PKSC#11 program interface as used by prior art implementations. There are three different classes of readers:
1. Direct controlled readers with vendor specific device driver(s)
2. PC/SC registered readers with standardized device driver(s)
3. Virtual (software emulated) readers with "virtual smart cards".

Each of these reader classes have their own default access priority scheme:
1. The direct controlled readers are defined in a special file named e.g. "Readers.cfg"
2. The PC/SC readers are prioritized in alphabetic order of the manufacturer name appended by a serial number assigned by the operation system at reader installation time
3. The virtual readers are sorted in alphabetic order of the names assigned at virtual smart card creation time.

All programs using the same API have access to all readers presented in e.g. in the PKCS#11 API in a slot list. The program can check if a smart card is inserted in a reader or if a virtual smart cards (VSC) is enabled or disabled.

In FIGS. 1(A–C) two programs using the readers which are listed above. All programs (AA,BB) have the same access rights as shown in columns, Appl. AA and Appl.BB' in FIG. 1(A). If a card is inserted as shown in FIG. 1(B), the access priority (column order) is changed so that the first card detected is now in reader "A-Ventor-Terminal" instead of "X-Vendor Terminal".

In FIG. 1(C) a new PC/SC reader of the same 'A-vendor' is added with a smart card inserted. This reader will be placed by the PC/SC operating system in a table of available reader directly behind the other reader from the same manufacturer and same reader type with suffix '2'. This will change the reader access priority (Column order) of all following readers for each program. In summary, these examples show that the program cannot be sure which reader and/or smart card is selected in priority when readers are replaced, added or removed.

FIG. 2 shows the basic components of the present invention namely configuration tool and reader access layer. The main function of the configuration tool (4) is to specify a reader access list used by the reader access layer (6). In a advantageous embodiment, each program will have its own reader access list (8,10,12). Another implementation may be that all programs are listed in a common reader access list. The reader access list (8,10,12) is advantageously laid down in a file and permanently stored in a nonvolatile storage media of the system and may be called up by the configuration tool (4) or by the reader access layer (6) by its file name. Amendments in the reader access list (8,10,12) are allowed by the configuration tool (4) only. New installed readers will not automatically change the access rights or priority order of the available readers (16) without using the configuration tool (4). The reader access list (8,10,12) contains configuration data relating access rights and priority rights for each single reader (14,16) in conjunction with each single program (2). Thus, a program (2) may or may not be granted access rights to a reader (14, 16) or a program (2) can be granted access to several readers using a priority identifier for selecting the reader (14,16) to be accessed at first. In a case of failing of a reader (e.g. failing serial connection, failing battery, missing smart card) to be accessed at first the reader with the next highest priority number has to be selected as backup-reader.

The reader access layer (6) communicates with each program directly, e.g. receives all requests from programs (2) seeking access to a reader, calls up the reader access list (8,10,12) for the requesting program (2), checks the access rights and the priority order for the available readers (e.g. which reader has to be accessed at first if more than one readers are accessible) and returns a response to the requesting program (2) containing information for accessing the active reader (14,16) with the highest priority.

A standard implementation of the present is that the both basic components are installed on one system. However it may be possible that the present invention may be used in a client-server architecture by distributing both components in a client and a server system. For example, the configuration tool (4) and the reader access layer (6) could be installed on the server side and the programs (2) could be installed on the client side. Another implementation may be that after each new configuration of the reader access list (8,10,12) on the server side, the updated reader access list will be send to the client. This implementation however requires that the reader access layer (6) is available on the server as well on the client system.

FIG. 2 shows the basic components of inventive access control mechanism in a system environment comprising for example three application programs AA,BB,CC (2) and four physical (16) and two logical readers (14). The logical (14) are two virtual readers (14) with virtual smart readers cards.

The virtual reader including the virtual smart cards may be created by the configuration tool. The virtual smart cards may be either enabled or disabled emulating the "Inserted/removed" status of a real smart card. For each registered application program (AA,BB,CC) for which a reader access list exists the configuration tool allows to specify access rights and priority rights for a specific application program (AA,BB,CC).

In the reader access list (8) for Appl.AA the priority (1) has been assigned to the 'PC/SC Reader A' (16) and the priority (2) to the virtual smart card 1(14). All other readers are not accessible for Appl.AA, which means they have the priority (0). If either the reader PC/SC Reader A (16) is not available or one of the portable hardware token 'Token 1' or 'Token 2' are not inserted in this Reader (16), the reader in the list with the next lower priority is used which is in this example the "virtual smart card" (14).

For the Appl. BB the reader 'CT-API Reader Y' (16) has the priority (1), 'Virtual Smart Card 2' (16) the priority (2), and 'PC/SC Reader B' (16) priority (3). For this program only these readers are accessible. In cases wherein only one token is used by the program, the 'PC/SC Reader B' with the lowest priority is only used if the 'CT-API Reader Y' is not available and the 'Virtual Smart Card' is disabled. For all other programs accessing readers the "standard priority list" is used.

Specifying a (0) in this list means that this reader is available only for registered programs with the reader selected. In FIG. 2 these are 'PC/SC Reader A' and 'Virtual Smart Card 1'. The remaining readers are assigned in the sequence of their assigned priorities 1 to n.

Figure 3:
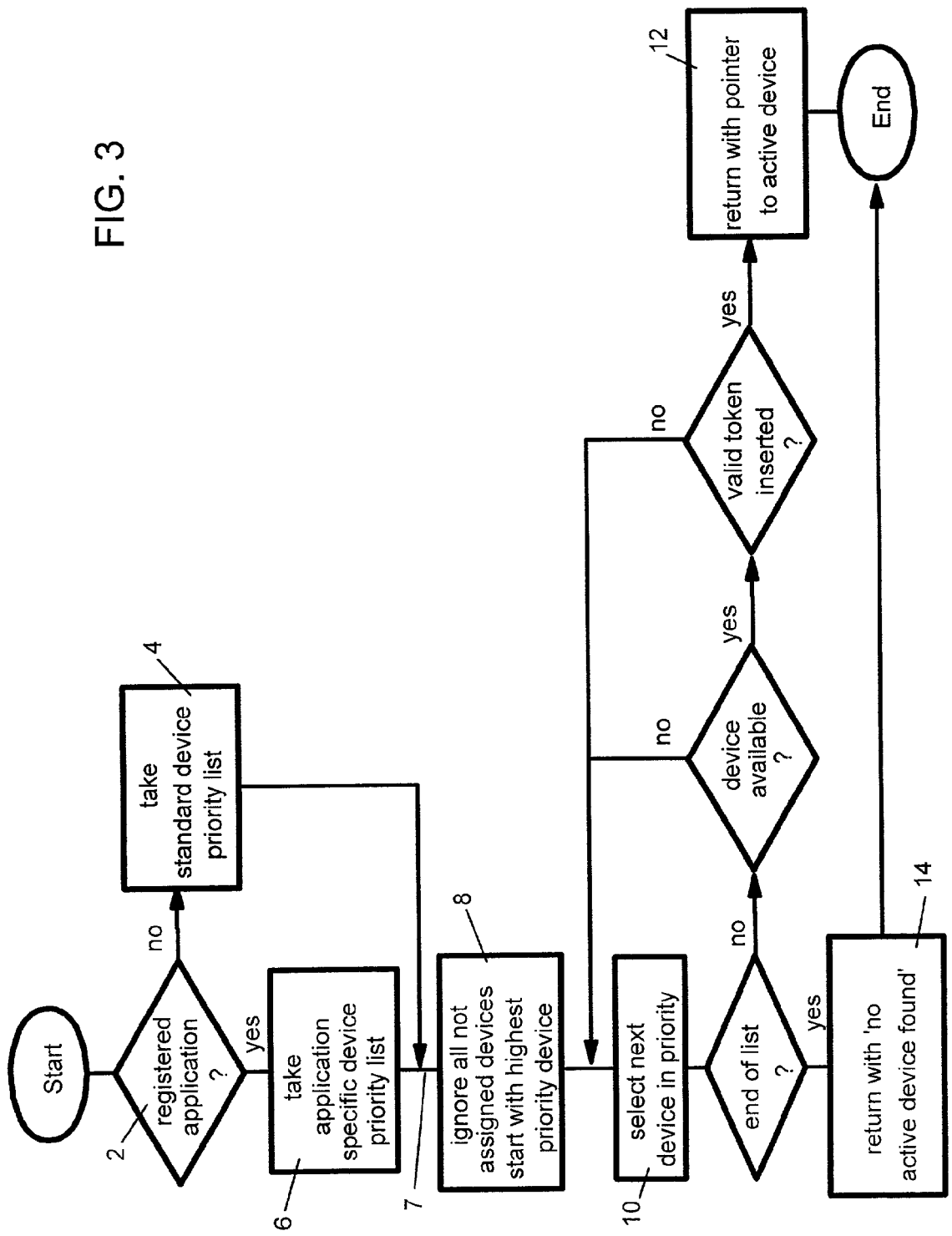
FIG. 3 shows an example flow chart which describes the inventive access control mechanism.

FIG. 3 shows a flow chart which describes the inventive access control mechanism as used by the present invention.

1. Program sends a request to the access layer for accessing a reader wherein the access layer examines whether the program is already registered.
2. Reader access layer examines whether a reader access list is available for the requesting program (2). If there is no reader access list available (the requesting program is not registered) the access layer calls up a standard reader access list used for unregistered programs only (4).
3. If the requesting program is registered, the reader access layer calls up the reader access list (6) and carries out a routine according to step 4) by ignoring not assigned readers (8). This applies accordingly for the standard priority.
4. The routine will start with the reader with the highest priority (8). If that reader is not available (e.g. smart card is not inserted or the reader is out of order), the reader with the next priority will be selected and so on until an active reader with a smart card inserted has been identified (10). In that case the program receives a return with a pointer to the active reader (12). If no reader is available, the program receives the information that "no active reader has been found" (14). The routine for determining the active reader with the highest priority will be applied for the standard priority accordingly (7).

The above access control mechanism is applied by the reader access layer only. A further embodiment could be that the routine according to step 4) is carried out by the program itself. In that case the reader access layer should provide information of the assigned readers with their priority order to the program.

FIGS. 4(A–H) show examples of reader access lists for illustrating the present invention.

In FIG. 4(A) reader access list is shown containing readers arranged by the operating system in a priority order (see left column). This priority order is generated by the operating system without using the idea of the present invention.

In FIG. 4(B) a reader access list according to the present invention is shown containing all available readers with the three priority columns. The administrator may specify the desired priority for general programs not registered (standard priority column) and for each program (Appl.AA, Appl.BB priority column) by entering a digit 1 to n. Entering the digit 0 will disable the reader for that program. When the reader access list has been completed for each program, as shown in FIG. 4(B), the priority sequence are different for all three readers groups. Some readers are not accessible for either Appl.AA or Appl.BB (indicated by a '0'). Optionally, the reader provided reader names may be customized for each program.

In FIG. 4(C) the readers are sorted by the specified "standard priority" and the program view and priority sequence of the different readers are shown for Appl.AA and Appl.BB assuming the status of the readers as shown in FIG. 4(A). Inserting a smart card into 'A-Vendor Terminal 1' will now effect only the program Appl.BB as shown in FIG. 4(D), the access priority per program is based on the specification in the reader access list.

In the next example a new PC/SC terminal (A-Vendor Terminal 2) is added to the system and will be automatically configured by the operating system. Without the present invention it would have the priority 4 as shown in FIG. 4(E). In the inventive reader access list the 'A-Vendor Terminal 2' is listed with the initial standard priority using the last previously specified priority number plus one (priority is 7) as shown in FIG. 4(F). For the programs Appl.AA and BB that reader is not available indicated by number '0'.

As shown in FIG. 4(G) the addition of this new reader will have no effect on the operation of the Appl.AA/BB. For programs using the standard priority it will appear as last reader in the priority order. If this reader should be made available to the Appl.AA/BB, the administrator has to change the priority number from '0' to any other priority number.

If this reader should be used by a new program a new column, e.g. Appl.CC priority, has to be added to the reader access list as shown in FIG. 4H. In addition, the standard priority may be changed by giving a certain priority for the available readers.

Figure 5:
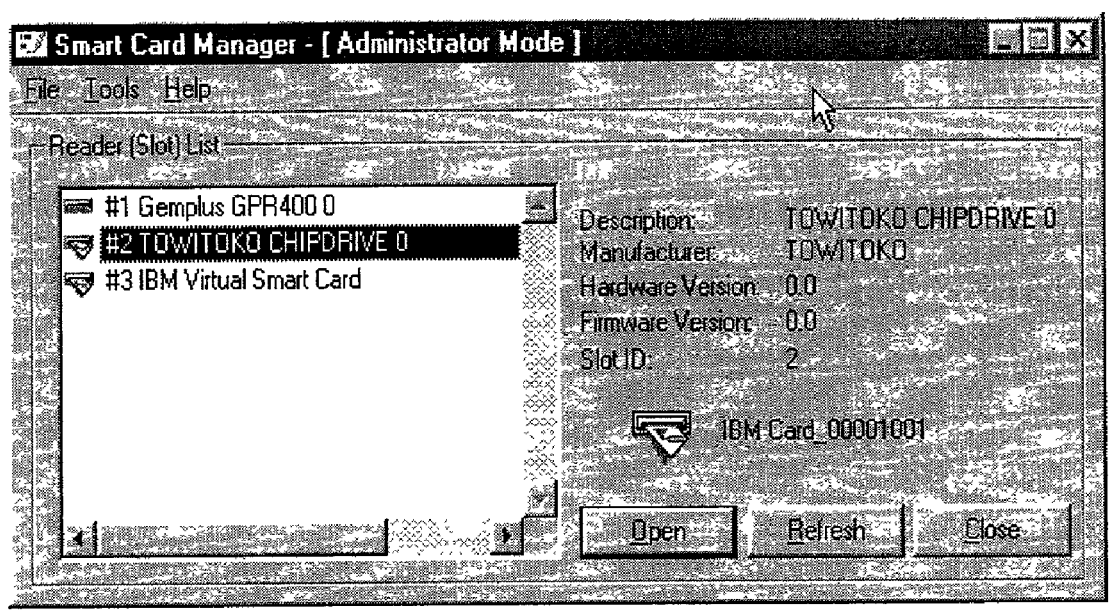
FIG. 5 shows an example of a reader list display which may be used by the present invention.

FIG. 5 shows an example of a reader list display advantageously used by the present invention. The configuration utility displays all attached real and virtual readers for the system administrator. In the present example two physical readers (Gemplus GPR 400 0; TOWITKOKO CHIPDRIVE) and one virtual reader (IBM Virtual Smartcard) are installed. In the TOWITKOKO CHIPDRIVE a smartcard is already inserted. This reader is now in an active status. This is indicated by specific insertion symbol. The remaining readers are in not active status. Out of this list the administrator has to define the priority order in which the readers are presented to the programs.

Although, the present invention has been described primarily with respect to readers only, every suitable I/O device with the functionality to communicate to different applications and which may be selected by user defined access conditions are also applicable for accomplishing the present invention. For example the I/O device may be a communication link, cryptographic adapter, printer, etc. Thus the word reader as used herein includes any I/O device.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. A method for accessing readers by means of a system comprising:
   an I/O port for establishing connection between said system and readers;
   a program having the functionality to communicate with said readers via said I/O port;
   an operating system providing access of said program to said readers;
   characterized by the further components;
   a configuration tool for specifying access conditions of said program to said readers;
   a reader access layer component for determining the reader to be accessed according to the access conditions specified by said configuration tool, the method comprising the steps of:
   sending a request for using a reader from said program to reader access layer;
   calling up a reader access list by said reader access layer;
   carrying out a routine by said reader access layer by means of said reader access list with the following steps:
   identifying an available reader with highest priority; and
   returning result to said program.

2. A method according to claim 1, wherein said routine comprises the steps of:
   identifying a particular reader with the highest priority by using said reader access list;
   examining the availability of said particular reader;
   if said particular reader is not available, identifying a next reader with the next lower priority by using said reader access list and examining the availability of said next reader; and
   repeating the steps of identifying and examining using a subsequent lower priority as long as an available particular reader is identified.

3. A method according to claim 1, wherein a newly added reader automatically receives the lowest priority in the reader access list.

4. A method according to claim 1, wherein programs having no assigned priorities in the reader access list receive a standard priority in said reader access list.

5. A method according to claim 1, including changing assigned priorities and standard priorities using the configuration tool.

6. A method according to claim 1, wherein the priority (0) means that the reader is only available for programs with this reader selected.

7. A computer program product stored on a computer-readable media containing software for performing a method for accessing readers by means of a system comprising:
   an I/O port for establishing connection between said system and readers;
   a program having the functionality to communicate with said readers via said I/O port;
   an operating system providing access of said program to said readers;
   characterized by the further components;
   a configuration tool for specifying access conditions of said program to said readers;
   a reader access layer component for determining the reader to be accessed according to the access conditions specified by said configuration tool, the method comprising the steps of:
   sending a request for using a reader from said program to reader access layer;
   calling up a reader access list by said reader access layer;
   carrying out a routine by said reader access layer by means of said reader access list with the following steps:
   identifying an available reader with highest priority; and
   returning result to said program.

8. An article of manufacture comprising a computer usable medium having computer readable program code means embodied therein for causing accessing of readers, the computer readable program code means in said article of manufacture comprising computer readable program code means for causing a computer to effect the steps of a method for accessing readers by means of a system comprising:
   an I/O port for establishing connection between said system and readers;
   a program having the functionality to communicate with said readers via said I/O port;
   an operating system providing access of said program to said readers;
   characterized by the further components:
   a configuration tool for specifying access conditions of said program to said readers;

a reader access layer component for determining the reader to be accessed according to the access conditions specified by said configuration tool, the method comprising the steps of:

sending a request for using a reader from said program to reader access layer;

calling up a reader access list by said reader access layer;

carrying out a routine by said reader access layer by means of said reader access list with the following steps:

identifying an available reader with highest priority; and returning result to said program.

9. A program storage device readable by machine, tangibly embodying a program of instructions executable by the machine to perform method steps for accessing of readers, said method steps comprising the steps of a method for accessing readers by means of a system comprising:

an I/O port for establishing connection between said system and readers;

a program having the functionality to communicate with said readers via said I/O port;

an operating system providing access of said program to said readers;

characterized by the further components:

a configuration tool for specifying access conditions of said program to said readers;

a reader access layer component for determining the reader to be accessed according to the access conditions specified by said configuration tool, the method comprising the steps of:

sending a request for using a reader from said program to reader access layer;

calling up a reader access list by said reader access layer;

carrying out a routine by said reader access layer by means of said reader access list with the following steps:

identifying an available reader with highest priority; and returning result to said program.

* * * * *